United States Patent
Hess et al.

(10) Patent No.: US 11,199,204 B2
(45) Date of Patent: Dec. 14, 2021

(54) SWITCHING DEVICE AND LUBRICATING PUMP

(71) Applicant: SKF LUBRICATION SYSTEMS GERMANY GMBH, Walldorf (DE)

(72) Inventors: Dieter Hess, Ludwigshafen (DE); Juergen Kreutzkaemper, Waibstadt-Daisbach (DE); Stefan Schuermann, Walldorf (DE)

(73) Assignee: SKF LUBRICATION SYSTEMS GERMANY GMBH, Walldorf (DE)

( * ) Notice: Subject to any disclaimer, the term of this patent is extended or adjusted under 35 U.S.C. 154(b) by 0 days.

(21) Appl. No.: 16/812,841

(22) Filed: Mar. 9, 2020

(65) Prior Publication Data
US 2020/0318658 A1    Oct. 8, 2020

(30) Foreign Application Priority Data
Apr. 5, 2019   (DE) .......................... 102019204874.9

(51) Int. Cl.
*F15B 15/04*   (2006.01)
(52) U.S. Cl.
CPC .................... *F15B 15/04* (2013.01)
(58) Field of Classification Search
CPC ..................................................... F15B 15/04
See application file for complete search history.

(56) References Cited

U.S. PATENT DOCUMENTS

| 2,192,402 A | * | 3/1940 | Gruetjen | ................... | F03C 1/14 |
| | | | | | 91/292 |
| 2009/0308692 A1 | | 12/2009 | Sattelberger et al. | | |

FOREIGN PATENT DOCUMENTS

DE   102006026274 A1   12/2007

OTHER PUBLICATIONS

Fluid Power Stewart, (C) 1980, pp. i,ii,34-39,472-474,589 (Year: 1980).*

* cited by examiner

*Primary Examiner* — F Daniel Lopez
(74) *Attorney, Agent, or Firm* — J-Tek Law PLLC; Scott T. Wakeman; Mark A. Ussai

(57) ABSTRACT

A switching device for alternately connecting a hydraulic drive of a lubricating pump to a pressure line and to a return line of a hydraulic circuit. The switching device includes first and second drive lines connected to the hydraulic drive, and pressure and return drive lines connected to the pressure and return lines. A switching valve is in fluid communication with the drive lines and is switchable between first and second switching states to connect the pressure drive line to the first drive line or to the second drive line. A plurality of hydraulic control lines control the position of the switching valve. The drive lines are configured to conduct a first volumetric flow of hydraulic fluid and the hydraulic control lines are configured to conduct a second volumetric flow of the hydraulic fluid different than the first volumetric flow.

13 Claims, 5 Drawing Sheets

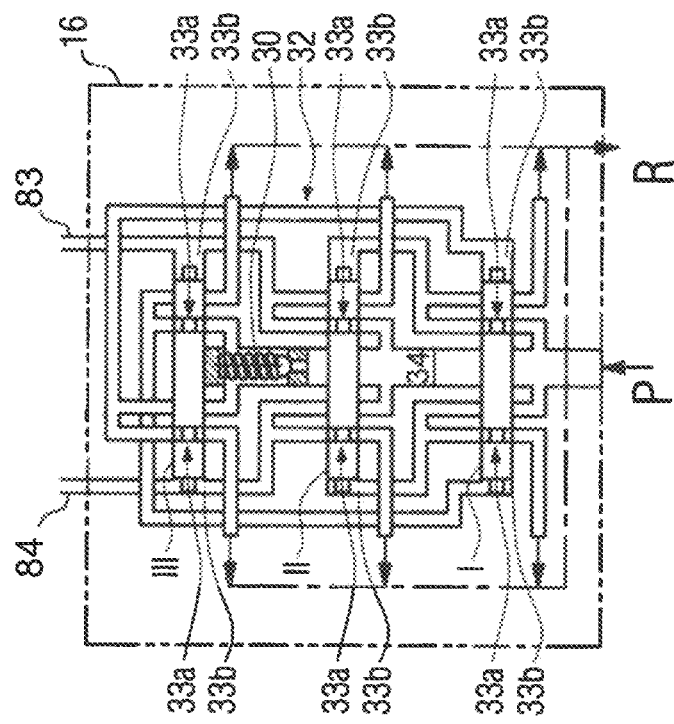
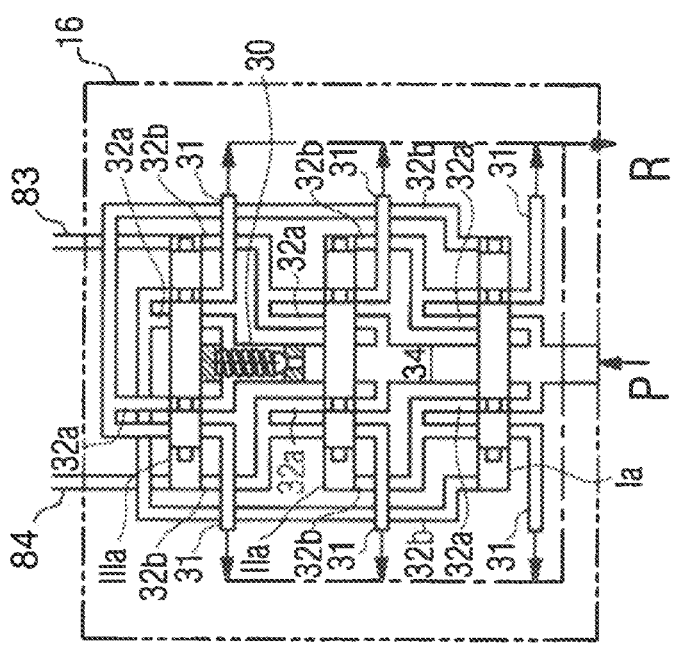
Fig. 5
Fig. 4

SWITCHING DEVICE AND LUBRICATING PUMP

CROSS-REFERENCE

This application claims priority to German patent application no. 10 2019 204 874.9 filed on Apr. 5, 2019, the contents of which are fully incorporated herein by reference.

TECHNOLOGICAL FIELD

The disclosure is directed to a switching device and a lubricating pump.

BACKGROUND

A range of differently designed lubricating pumps is known from the prior art, which pumps are used, for example, for lubricating hydraulically driven tools. One application case would be the lubricating of hydraulic impact tools, such as hydraulic hammers of a construction machine. Here embodiments are known that are driven without their own energy source by the hydraulic circuit of the tool or of the construction machine. The hydraulic circuits for striking tools are characterized in that the hydraulic pressure repeatedly increases and decreases. The change between pressure increase and pressure decrease generates the impact movement of the striking tool. Numerous other applications are known of lubricating pumps for lubricating hydraulic tools and other machines.

From DE 10 2006 026 274 A1 (family member of US 2009/308692) a lubricating pump is known wherein a drive piston is configured in a double-acting manner with two drive chambers, and a switchable and hydraulic-pressure-actuatable switching unit is provided by which the drive chambers are alternately connectable in operation to a pressure line of the hydraulic circuit. The switching unit is configured as a progressive distributor that is operated by the hydraulic circuit.

SUMMARY

An object of the disclosure is to provide an improved and flexibly usable switching device and a lubricating pump of such a switching device.

According to one aspect of the disclosure, a switching device for alternatingly connecting lines of a hydraulic drive of a lubricating pump to a pressure line and a return line of a hydraulic circuit is provided as a preferred embodiment of the disclosure, including the following features:
  hydraulic lines that are connectable to the lines of the hydraulic drive, and further hydraulic lines that are connectable to the pressure line and the return line,
  a switching valve that is configured to interact with the hydraulic lines such that in a first switching state of the switching device at least one first of the lines of the hydraulic drive is connectable to the pressure line, and that in a second switching state of the switching device at least one second of the lines of the hydraulic drive is connectable to the pressure line,
  a hydraulic control unit including hydraulic control lines, of which at least the first of the control lines is connectable to the pressure line,
  wherein the second of the control lines are configured as switching lines such that the switching valve is switchable by them between the first switching state and the second switching state,
  wherein the hydraulic lines and the control lines are configured such that a different volumetric flow of hydraulic fluid is directable by the hydraulic lines than by the control lines.

Here the disclosure is based inter alia on the recognition that in known lubricating pumps including hydraulic control units, the hydraulic fluid flowing through the control lines is also directed into the hydraulic drive for its driving. It has been further recognized that in the constructive design of lubricating pumps for various applications and requirements, for example, various pumping capacities, the hydraulic drives require different sizes and thus different volumetric flows of hydraulic fluid for smooth operation. For this purpose the lines are dimensioned correspondingly larger or smaller in order to be able to transport a larger or smaller amount of hydraulic fluid per unit of time. In known embodiments of such lubricating pumps it was then necessary to design all lines correspondingly larger or smaller. The disclosure is furthermore based on the recognition that the control unit does not require a particularly large volumetric flow per se to perform its function. Therefore, two logical, internal hydraulic circuits so to say are provided in the switching device: on the one hand a hydraulic control circuit provided by the hydraulic lines, and on the other hand a hydraulic control circuit provided by the control lines, through which different volumetric flows are directable despite fluidic connection. By periodically alternately connecting, via the hydraulic lines of the switching device, the lines of the hydraulic drive to the pressure line and the return line, the switching valve regulates the fluid connections between the different hydraulic lines in the hydraulic drive circuit that the hydraulic drive drives. The switching process between the two switching states is in turn driven by the also-hydraulic control unit including the control line, i.e. the hydraulic control circuit. The control unit is preferably driven by the same hydraulic circuit, "external" with respect to switching device, which hydraulic circuit provides the pressure line and return line.

The control lines can thus be made compact, independent of the volumetric flow required for the operation of the hydraulic drive, which reduces the space and material requirement of the control unit.

The control unit can preferably comprise hydraulic control elements by which the hydraulic control pulses are generatable that are transportable by the switching lines and by which a switching process of the switching valve is triggerable. The control elements are preferably embodied movable.

The switching device can in principle be configured modular and flexibly connected to the hydraulic drive and the hydraulic circuit. It can also be completely integrated into a lubricating device, so that corresponding first of the hydraulic lines is permanently connected to first of the lines of the hydraulic drive, or respectively connected hydraulic lines and lines of the hydraulic drive are configured de facto as one line. Depending on the switching state, the switching process by the switching valve connects different of the hydraulic lines to one another, so that the hydraulic drive operates as described above.

The switching valve and the hydraulic lines are preferably configured interacting such that in the first switching state of the switching device at least one first of the hydraulic lines connectable to the lines of the hydraulic drive is connected to at least one of the hydraulic lines connectable to the pressure line, and that in the second switching state of the switching device at least one second of the hydraulic lines connectable to the lines of the hydraulic drive is connected to the at least one of the hydraulic lines connectable to the pressure line.

In the first switching state of the switching device, the switching valve is preferably configured to interact with the hydraulic lines such that at least one of the second lines of the hydraulic drive is connectable to the return line, and that in the second switching state of the switching device at least one of the first lines of the hydraulic drive is connectable to the return line.

In one preferred embodiment of the disclosure, the switching valve is configured as a switching piston interacting with two switching chambers, and the switching chambers are connected to the switching lines of the switching unit. Hydraulic fluid can be alternately directed by the control lines into one of the control chambers, while the other is connected to the return line. This triggers the switching process of the switching piston, which moves back and forth in a chamber.

In one preferred embodiment of the disclosure, the switching device comprises at least one adjusting unit that is configured to interact with the switching valve such that in the switching states of the switching device the volumetric flow directable by the hydraulic lines is adjustable. A structurally identical switching device can thus respectively be used for the driving and for the controlling of a plurality of hydraulic drives having different requirements for the volumetric flow, which increases its range of use and reduces the constructive expense.

In one preferred embodiment of the disclosure, the control unit comprises a progressive distributor. A progressive distributor can advantageously be used for controlling the switching valve and be driven by the hydraulic circuit. A separate drive is not required, but technically possible.

In one preferred embodiment of the disclosure, two outlets of the progressive distributor are connected to the switching lines or form them. Thus the switching valve can be switched with relatively low effort directly following the known method of operation of the progressive distributor.

In one preferred embodiment of the disclosure, the progressive distributor includes at least two control pistons that are hydraulically connected to a part of the control lines and are configured to be controllable by it. It particularly preferably includes three control pistons. A particularly reliable operation is ensured here.

In one preferred embodiment of the disclosure, the progressive distributor comprises a pressure-limiting valve. The pressure-limiting valve can be configured such that it is set to open at a fixed pressure. However, an adjustable pressure-limiting valve can also be provided.

According to another aspect of the disclosure, a lubricating pump is provided, including the following features:
  a hydraulic drive including lines for connecting to a pressure line and a return line of a hydraulic circuit,
  a pumping unit for lubricant, which pumping unit is connected to the hydraulic drive and is designed to be drivable by the hydraulic drive, and
  a switching device according to other aspects of the disclosure which is connected to the lines of the hydraulic drive.

According to another aspect of the disclosure a switching device is provided for alternately connecting a hydraulic drive of a lubricating pump to a pressure line and to a return line of a hydraulic circuit. The switching device comprises a first drive line and a second drive line connected to the hydraulic drive, a pressure drive line connected to the pressure line and return drive line connected to the return line, and a switching valve in fluid communication with the first and second drive lines and the pressure drive line and the return drive line, the switching device being switchable between a first switching state and a second switching state. In the first switching state the pressure drive line is connected to the first drive line and in the second switching state the pressure drive line is connected to the second drive line. The device also includes a hydraulic control unit, for example, a progressive distributor, that includes a plurality of hydraulic control lines. A first one of the hydraulic control lines is connected to the pressure drive line, and at least two second hydraulic control lines of the plurality of hydraulic control lines are configured as switching lines such that the switching valve is switchable by the at least two second hydraulic control lines between the first switching state and the second switching state. The first and second drive lines and the pressure drive line and the return drive line are configured to conduct a first volumetric flow of hydraulic fluid, and the plurality of hydraulic control lines are configured to conduct a second volumetric flow of the hydraulic fluid different than the first volumetric flow.

Consequently a lubricating pump is thereby provided that comprises a hydraulic drive including lines for connecting to a pressure line and a return of a hydraulic circuit, and a pumping unit for lubricant that is designed to be connected to the hydraulic drive and is drivable thereby, wherein the hydraulic drive comprises a switching device including the following features:
  hydraulic lines that are connectable to the lines of the hydraulic drive, and further hydraulic lines that are connectable to the pressure line and the return line,
  a switching valve that is configured to interact with the hydraulic lines such that in a first switching state of the switching device at least one first of the lines of the hydraulic drive is connectable to the pressure line, and that in a second switching state of the switching device at least one second of the lines of the hydraulic drive is connectable to the pressure line,
  a hydraulic control unit including hydraulic control lines, of which at least the first of the control lines is connectable to the pressure line,
  wherein the second of the control lines are configured as switching lines such that the switching valve is switchable by them between the first switching state and the second switching state,
  wherein the hydraulic lines and the control lines are configured such that a different volumetric flow of hydraulic fluid is directable by the hydraulic lines than by the control lines.

Such a lubricating pump can be easily constructively designed to meet various requirements, since in most cases the control unit can be embodied identically or only with slight modifications.

Advantages, features, and details of the invention arise from the exemplary embodiments of the invention described below with reference to the Figures.

BRIEF DESCRIPTION OF THE DRAWINGS

FIGS. 4 and 5 are a schematic representations of a control unit according to the disclosure.

DETAILED DESCRIPTION

Figure 1:
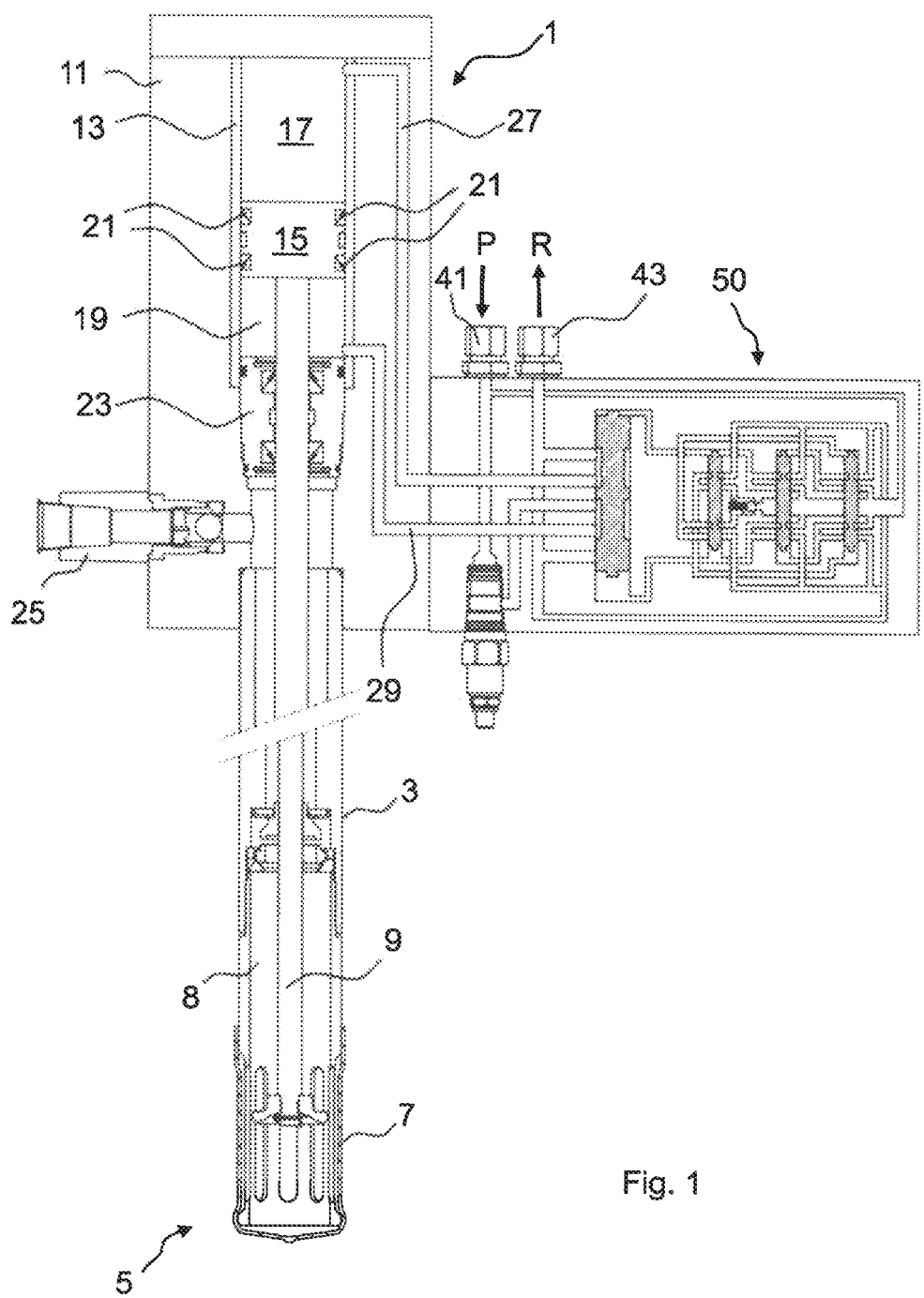
FIG. 1 is a lubricating pump according to one embodiment of the disclosure.

In FIG. 1 a lubricating pump 1 is depicted as an embodiment of the disclosure. It is configured as a piston pump including a pump tube 3. The pump tube 3 is shown shortened in the representation and can have different lengths or diameters depending on the design and requirements. On the lower end 5, the pump tube 3 includes a plurality of openings 7 through which lubricant for pumping can be received. A pumping piston 9 is disposed in the pump tube 3, which pumping piston 9 can be one- or multi-part. The same applies for the pump tube 3. The pumping piston 9 is configured smaller with respect to the diameter than the pump tube 3, so that a pumping space 8 arises between the pumping piston 9 and pump tube 3.

At the upper end the pump tube 3 is attached in a housing 11. The pump tube 3 projects into a recess of the housing 11, wherein a hydraulic drive cylinder 13 is disposed. In the drive cylinder 13 a drive piston 15 is movably disposed, which drive piston 15 divides the drive cylinder 13 into two drive chambers 17 and 19. For fluidic separation of the drive chambers 17 and 19, two seals 21 are disposed in a radially encircling manner on the drive piston 15. The pumping piston 9 is connected to the drive piston 15 and is thus movable up and down by it. At the upper end of the pump tube 3 a seal unit 23 is disposed at the transition to the drive cylinder 13, which seal unit 23 separates the pumping space 8 from the drive chamber 19. It is thereby ensured that lubricant located in the pumping space 8 cannot reach into the driving chamber 19. A lubricating connection 25 is disposed in the housing 11 and connected to the pumping space and through which the pumped lubricant can escape. Corresponding to-be-lubricated tools or machines can be connected to the lubricating connection via lines.

For operation the lower end 5 of the pump tube 3 is immersed into a lubricant reservoir not depicted here, and the pumping piston 9 is moved up and down by the drive piston 15. The drive of the drive piston 15 is explained in detail with reference to FIGS. 2 and 3. Lubricant entering into the pumping space 8 is moved upward in the pumping space 8 by the moving pumping piston 9 and emerges at the lubricating connection 25.

The drive piston 15 can be hydraulically operated, for which purpose the lubricating pump 1 includes two connections 41 and 43, configured, for example, as quick couplings, via which connections the lubricating pump 1 can be integrated into a hydraulic circuit not depicted here. For this purpose the connection 41 is connected to the pressure line of the hydraulic circuit, and the connection 43 is connected to the return line, which is symbolized here by P and R with corresponding direction arrows. By the connection 41, hydraulic fluid is consequently directed into the lubricating pump 1 under constant or alternating pressure and is discharged again by the connection 43.

To move the drive piston 15 up and down, it is necessary to alternately fill the drive chambers 17 and 19 with hydraulic fluid under pressure and empty them again. For this purpose the drive chambers 17 and 19 must be alternately connected to the connections 41 and 43. When the drive chamber 17 is connected to the connection 41, i.e., the pressure line, and is to be filled with hydraulic fluid, the drive chamber 19 must be connected to the connection 43, i.e., the return line, so that its fill level can be reduced. The pressure of the hydraulic fluid and the thereby increasing fill level of the drive chamber 17 moves the drive piston 15 downward. It is conversely true when the drive chamber 19 is connected to the connection 41, i.e., the pressure line, and is to be filled with hydraulic fluid the drive chamber 17 must be connected to the connection 43, i.e., the return line, so that the fill level therein can be reduced. The pressure of the hydraulic fluid and the thereby increasing fill level of the drive chamber 19 moves the drive piston 15 upward.

This cycle is repeated periodically during operation of the lubricating pump 1, and thus a regular reconnecting of the drive chambers 17 and 19 to the connections 41 and 43 is required. For this purpose a switching device in the form of a fluidic switching unit 50 is disposed in the lubricating pump 1. The switching unit 50 is fluidically connected on the one hand to the drive chambers 17 and 19 via channels 27 and 29 formed in the housing 11. On the other hand, in the embodiment shown the connections 41 and 43 are disposed directly on the switching unit 50, so that hydraulic fluid from the pressure line can come through the switching unit 50 and the channels 27 or 29, depending on the switching state of the switching unit 50, into the drive chambers 17 or 19, or can be directed from these into the return line.

The representation of FIG. 1 is merely of schematic nature. In actual embodiments of the disclosure the switching unit 50 can be configured in a different shape and arrangement and can be integrated, for example, into the housing 11. Alternatively it can be constructed in a modular manner and be connected to the housing 11 via hydraulic hoses using quick couplings.

Figure 2:
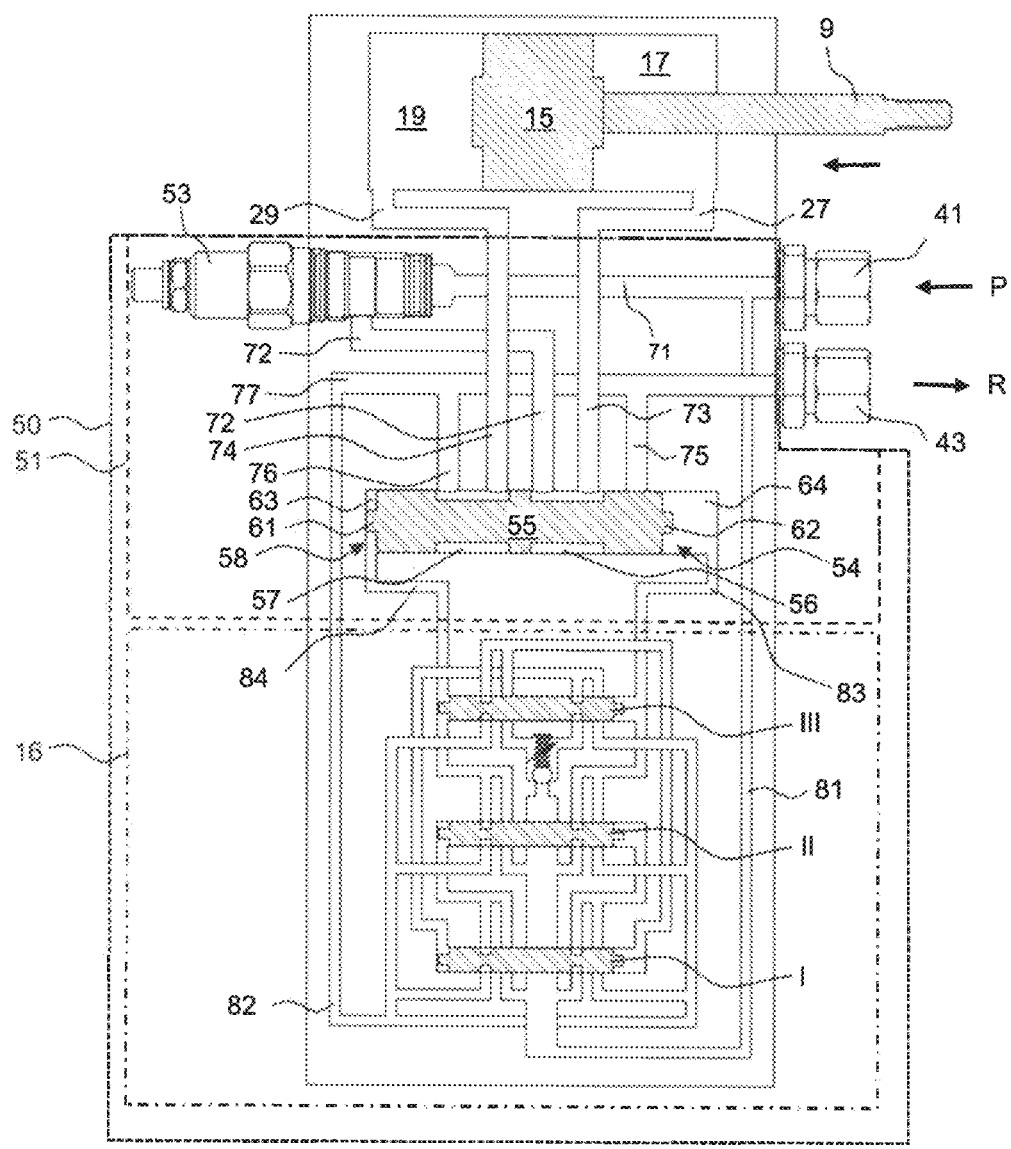
FIGS. 2 and 3 are schematic representations of a switching device, according to one embodiment of the disclosure, in first and second operating states.
Figure 3:
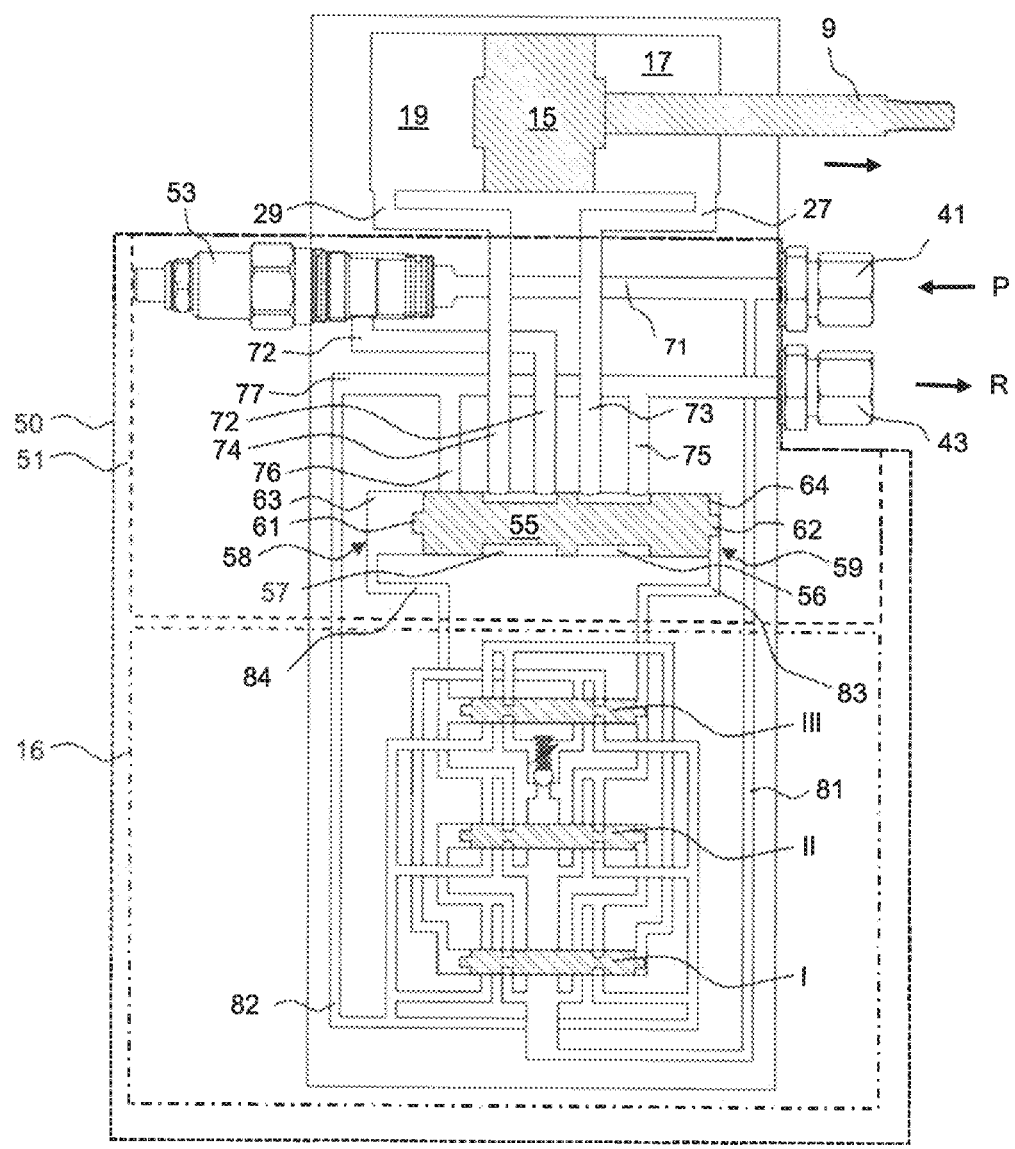

In FIGS. 2 and 3 the switching unit 50 is depicted for the purpose of illustrating its functioning and the interaction with the drive piston 15. In comparison to FIG. 1, the representation is therefore structured in a simplified manner and only shows the essential components in a simplified arrangement.

The switching unit 50 is divided into two subunits that are configured to cooperate. A drive unit 51 is depicted in the upper region and highlighted by a frame. In the lower region the switching unit 50 includes a control unit in the form of a progressive distributor 16.

The drive unit 51 includes a number of drive channels 71 to 77 that are connected to the connections 41 and 43 and to the channels 27 and 29. In detail a drive channel 71 leads from the connection 41 to a flow-control valve 53, by which the speed of the hydraulic piston 15 can be regulated. From the flow-control valve 53 a drive channel 72 leads to a chamber 54, wherein a switching piston 55 is movably disposed. The switching piston 55 is configured axially shorter than the chamber 54. The chamber 54 is connected to the drive chamber 17 via a drive channel 73 and the drive channel 27. The chamber 54 is further connected to the drive chamber 19 via a drive channel 74 and the drive channel 29. The chamber 54 is further connected via two drive channels 75 and 76 to a drive channel 77, and via this drive channel 77 to the connection 43.

Consequently hydraulic fluid can reach from the pressure line into the drive chamber 17 or 19 via the drive channel 71, the flow-control valve 53, the drive channel 72, the chamber 54, and the drive channel 73 or 74. Hydraulic fluid can also reach into the return line from the drive chambers 17 or 19 via the drive channels 73 or 74, the chamber 54, the drive channels 75 or 76, and the drive channel 77. However, the design of the switching piston 55 prevents a permanent fluidic connection of the drive channels 73, 74, 75 and 76 via the chamber 54.

The switching piston 55 is generally cylindrical and is adapted with respect to its outer diameter to the inner diameter of the chamber 54. If this outer diameter were to be constant over the entire axial length of the switching piston 55, the outer surface of the switching piston 55 would completely abut against the inner wall of the chamber 54 and thus fluidically separate the drive channels 73, 74, 75 and 76 from one another. For the temporary pairwise connection of the drive channels 73, 74, 75 and 76 to one another, the switching piston 55 includes two radial grooves 56 and 57 whose axial length is adapted to the inner diameter, and spacing with respect to one another, of the drive channels 73, 74, 75 and 76. Two switching states of the switching unit 50 are defined by the position of the switching piston 55 in the chamber 54. Here the switching piston 55 in the representation of FIG. 2 lies in the left side of the chamber 54 and contacts its left inner wall 58. This defines the first of the two switching states. In FIG. 3 the switching piston 55 lies in the right side of the chamber 54 and contacts its right inner wall 59. This defines the second of the two switching states.

In the first switching state the groove 56 lies in the chamber 54 in such a manner that an annular cavity lies in the region of the opening of the drive channels 72 and 73 into the chamber 54 that establishes a fluidic connection of the drive channels 72 and 73.

Simultaneously the groove 57 lies in the chamber 54 in such a manner that an annular cavity lies in the region of the opening of the drive channels 74 and 76 into the chamber 54 that establishes a fluidic connection of the drive channels 74 and 76. The opening of the drive channel 75 into the chamber 54 is blocked by the surface of the switching piston 55; the drive channel 75 is thus fluidically separated from the chamber 54. In this switching state the drive chamber 17 is consequently connected to the pressure line, and the drive chamber 19 is connected to the return line. The drive chamber 17 thus increasingly fills with hydraulic fluid, while the drive chamber 19 can simultaneously empty. This results in a movement of the drive piston 15 and thus of the pumping piston 9 to the left, which is symbolized by an arrow. This corresponds, in the representation of FIG. 1, to an upward movement of the pumping piston 9.

In the second switching state depicted in FIG. 3, the groove 56 lies in the chamber 54 in such a manner that an annular cavity lies in the region of the opening of the drive channels 73 and 75 into the chamber 54 that establishes a fluidic connection of the drive channels 73 and 75. Simultaneously the groove 57 lies in the chamber 54 in such a manner that an annular cavity lies in the region of the opening of the drive channels 72 and 74 into the chamber 54 that establishes a fluidic connection of the drive channels 72 and 74. The opening of the drive channel 76 into the chamber 54 is blocked by the surface of the switching piston 55; the drive channel 76 is thus fluidically separated from the chamber 54. In this switching state the drive chamber 19 is consequently connected to the pressure line, and the drive chamber 17 is connected to the return line. The drive chamber 19 thus increasingly fills with hydraulic fluid, while the drive chamber 17 can simultaneously empty. This results in a movement of the drive piston 15 and thus of the pumping piston 9 to the right, which is symbolized by an arrow. This corresponds in the representation of FIG. 1 to an upward movement of the pumping piston 9. In this respect, with respect to the functionality the switching piston 55 is a so-called 4/2 directional valve.

Due to a regular movement of the switching piston 55 between the end positions in the chamber 54, the drive chambers 17 and 19 are thus alternately connected to the pressure line or the return line, so that the drive piston 15 subsequently moves back and forth, and the lubricating pump 1 thus pumps lubricant. The movement of the switching piston 55 between its end positions in the chamber 54 is achieved and controlled by the progressive distributor 16. For this purpose the progressive distributor 16 is also connected to the pressure line and the return line and thus also uses the hydraulic circuit. A separate drive of the lubricating pump 1 is thus not required.

The progressive distributor 16 is connected via a control channel 81 to the drive channel 71, and via this to the connection 41 and thus to the pressure line. The progressive distributor 16 is further connected via a control channel 82 to the drive channel 77, and via this to the connection 43, therefore the return line. In addition, the progressive distributor 16 is connected to the chamber 54 via two control channels 83 and 84, wherein the control channel 83 opens into the region of the right inner wall 59 of the chamber 54, and the control channel 84 into the region of the left inner wall 58. The switching piston 55 includes a circular projection 61 or 62 on each end side. In the left end position of the switching piston 55 the projection 61 contacts the inner wall 58 of the chamber 54, whereby an annular control space 63 is defined. The control channel 84 is situated such that it opens into the control space 63. In the right end position of the switching piston 55 the projection 62 contacts the inner wall 59 of the chamber 54, whereby an annular control space 64 is defined. The control channel 83 is situated such that it opens into the control space 64, which is depicted in FIG. 3.

The progressive distributor 16 comprises three control pistons I, II, and III and is on the one hand configured to be able to connect the control channel 81, therefore the pressure line, to the control channel 83, therefore the control chamber 64. Here the control channel 82, therefore the return line, is simultaneously connected to the control channel 84, therefore the control chamber 63. This is the state depicted in FIG. 2, wherein the control chamber 64 is thus connected to the pressure line, and the switching piston 55 is therefore moved or pressed by the hydraulic fluid to its left end position. The drive chamber 17 subsequently fills continuously with hydraulic fluid, so that the drive piston 15 moves to the left. In this state the control pistons I, II, and III lie in their left end position, which is explained in more detail with reference to FIGS. 4 and 5.

The progressive distributor 16 is further configured to be able to connect the control channel 81, therefore the pressure line, to the control channel 84, therefore the control chamber 63. Here the control channel 82, therefore the return line, is simultaneously connected to the control channel 83, therefore the control chamber 64. This is the state depicted in FIG. 3, wherein the control chamber 63 is thus connected to the pressure line, and the switching piston 55 is therefore moved or pressed by the hydraulic fluid to its right end position. The drive chamber 19 subsequently fills continuously with hydraulic fluid, so that the drive piston 15 moves to the right. In this state the control pistons I, II, and III lie in their right end position.

When the drive piston 15 reaches its left end position, the progressive distributor 16 switches, by corresponding hydraulically driven movement of the control pistons I, II, and III into the right end position, the connection of the control chambers 63 and 64 to the pressure line and the return line, so that the switching piston 55 moves into the right end position, and thus the connection of the drive chambers 17 and 19 to the pressure line and the return line also switch. The drive piston 15 is consequently moved from its left end position into the right end position, where the connections in turn switch due to the progressive distributor 16 and the switching piston 55.

As depicted in FIGS. 2 and 3, the drive channels 71 to 77 are embodied with larger diameter than the control channels of the progressive distributor 16. Due to the switching piston 55 disposed between the progressive distributor 16 and the drive piston 15, two hydraulic circuits having different volumetric flows can be implemented here. Due to the switching piston 55 a fluidic connection of the control channels 83 and 84 to the drive channels 72 to 77 via the chamber 54 is prevented. The drive unit 51 includes drive channels of relatively large diameter, in particular in comparison to the control channels of the progressive distributor 16. The diameters of the drive channels 71 to 77 are configured for the requirements of the respective hydraulic drive to be operated, so that the volumetric flows required for the operation of the pump can be provided.

The progressive distributor 16 contains numerous control channels of relatively small diameter, since to implement its function, namely the movement of the switching piston 55, only a relatively small volumetric flow of hydraulic fluid is required. Only the control chambers 63 and 64 need to be filled with hydraulic fluid under pressure and emptied. The progressive distributor can thus be made very compact and in particular can be embodied with identical size, independently of the actual diameter of the drive channels in many sizes and embodiments of the lubricating pump. This significantly reduces the constructive cost of an assortment of lubricating pumps of different designs and sizes. In known embodiments of such lubricating pumps, the hydraulic fluid was directed directly from the progressive distributor into the hydraulic drive, so that only one hydraulic circuit was implemented. For this purpose all channels in the progressive distributor had to be dimensioned in accordance with the required volumetric flows of the hydraulic drive, which meant an enormous constructive cost as well as great demand for space and material.

FIGS. 4 and 5 show an embodiment of the progressive distributor 16 in a schematic, simplified sectional representation to explain the functioning. In FIG. 4 the progressive distributor 16 is located in the operating position wherein the control channel 84 and the switching chamber 63 are connected to the pressure line (via the control channel 81, here symbolized in a simplified manner by P) and the control channel 83, and the switching chamber 64 to the return line (via the control channel 82, here symbolized in a simplified manner by R). FIG. 5 shows the embodiment of FIG. 4 in the other operating position wherein the control channel 83 is connected to the pressure line P, and the control channel 84 is connected to the return line R.

In the embodiment of FIGS. 4 and 5, the progressive distributor 16 is configured with the three control pistons I, II, and III, a central channel 34 connected to the pressure line P, and a pressure-limiting valve 30 disposed in the central channel 34. The pressure-limiting valve 30 ensures that the progressive distributor 16 switches between the control positions at the correct time and thus moves the switching piston 55. It is adjustable from outside with respect to the hydraulic pressure triggering it, which is indicated by an arrow. Up to the two outlets of the progressive distributor 16, which two outlets are connected to the switching channels 83 and 84, all outlets 31 of the progressive distributor 16 are connected to the return line R.

At least two pairs of control lines 32 and at least one pair of outlets 31 are associated with each control piston I, II, III. Here first sections 32a of a first pair of control channels 32 are passed through a cylinder Ia, IIa, IIIa, which cylinder receives the respective control pistons I, II, III, and can be opened and closed by at least two piston sections 33a of the respective control piston. The first sections 32a each open at their one end in the central channel 34, and transition at their other end into second sections 32b of the control channels. The second sections 32b each open at the end sides of the control pistons I, II, III into drive chambers 33b disposed there. Consequently each control line 32 connects a drive chamber 33b of a control piston I, II, III via a piston section 33a of another control piston to the central channel 34. With corresponding position of the other control piston in the cylinder Ia, IIa, IIIa, the connection is either blocked or opened.

In the exemplary embodiment of FIGS. 4 and 5, the control channels are disposed here as follows:

The control channels 32 opening into the drive chambers 33b of the control piston II are connected via the control piston I to the pressure line P (FIG. 4). The control channels opening into the drive chambers 33b of the control piston III are guided via the piston sections 33a of the control piston II. The control channels opening into the drive chambers 33b of the control piston I are guided via the piston sections 33a of the control piston III. Except for the control channels guided by the control piston I via the control piston III, the control channels 32 each lie on both sides of the symmetrically configured control pistons I, II, III.

The outlets 31 also extend via the piston sections 33a parallel to the first sections 32a of the control channels 32 and open like these into the second section 32b of the control channels. Here the piston sections 33a are each dimensioned such that they either simultaneously close both the outlet 31 associated with them and the first section 32a associated with them, or only close one thereof. Since a pair of control channels 32 each leads to the drive chambers 33b on the end surfaces of the associated control piston I, II, III, each control piston is displaced into one of its two end positions as soon as one control channel 32 of this pair is connected to the pressure line P and the other control channel 32 of this pair is connected to the return line R.

In each case an outlet 31 is opened in the end positions of the control piston I, II, III, and simultaneously the section 32a of a control channel 32, which section 32a is parallel to this outlet, is closed by a piston section 33a, so that the second section 32b of this control channel 32 is connected to the return line R. In addition, the first section 32a of the other control channel 32a leading through the control piston I, II, III is opened, while the outlet 31 parallel to this section 32a is simultaneously closed by the other piston section 33a, so that the opened control channel 32 is connected to the pressure line P. Each control piston I, II, III thus has a first operating position and a second operating position that correspond to its two end positions in the cylinder Ia, IIa, IIIa: In the first operating position, one drive chamber 33b of the control piston connected via the control channel 32 is acted upon by the hydraulic pressure, and the other drive chamber 33b is connected to the return line R via the outlet 31. In the second operating position the other drive chamber 33b of this control piston I, II, III is acted upon by the hydraulic pressure, and the other drive chamber 33b is connected to the return line R. Correspondingly, with switching back and forth between the drive chambers 33b of a control piston I, II, III, which drive chambers 33b are connected to the control channels, the drive chambers 33b of a control piston I, II, III are alternately connected to the pressure line P in the two operating positions.

The diameter of the central channel 34 is larger than that of the cylinders Ia, IIa, IIIa, so that independently of the position of the control pistons I, II, III the entire central channel 34 is always connected to the pressure line P up to the pressure-limiting valve 30. The pressure-limiting valve 30 is disposed between the central channel 34 and the two control channels 32 through the control piston III and is configured such that it only opens with exceeding of a predetermined hydraulic pressure in the pressure line P, and depending on the position of the control piston III connects one of the drive chambers 33*b* of the control piston I to the pressure line P.

The function of the progressive distributor 16 of FIGS. 4 and 5 is as follows: In FIG. 4 the control channel 84 is connected via the drive chamber 33*b* of the control piston III and the control piston II to the pressure line P. The switching piston 55 is correspondingly displaced into the right end position in FIG. 3, since the switching chamber 63 is acted upon by the hydraulic pressure. The drive piston 15 is correspondingly moved according to FIG. 3.

In the end position of the drive piston 15 the pressure rises in the pressure line P until the predetermined minimum switching pressure of the pressure-limiting valve 30 is reached and opens the pressure-limiting valve 30. With opened pressure-limiting valve 30, the left control channel 32 in FIG. 4 of the control piston III is connected to the right drive chamber 33*b* in FIG. 4 of the control piston I. The right outlet 31 of the control piston III is simultaneously connected to the left drive chamber 33*b* of the control piston I. The control piston I is acted upon by the hydraulic pressure in the pressure line P on its right end surface and moves into its left end position, wherein it connects the right control channel 32 to the right drive chamber 33*b* of the control piston II, while it simultaneously connects the left drive chamber 33*b* of the control piston II to the return line R via the outlet 31. The control piston II consequently moves from the right end position depicted in FIG. 4 into the left end position as soon as the control piston I is displaced into the also-left end position.

In the left end position the control piston II in turn connects the right control channel 32 to the right drive chamber 33*b* of the control piston III, and thus the control channel 83 to the pressure line P. Simultaneously the control piston II closes the left control channel 32 and connects the left drive chamber 33*b* of the control piston III and thus the control line 84 to the outlet 31 associated therewith. The control piston III and the switching piston 55 can thus each move into their left end position and subsequently move the drive piston 15 from the one, right end position into the other, left end position (see FIG. 2).

At the end of this switching process all control pistons I, II, III, and the switching piston 55 are moved into their left end position, as is shown in FIG. 5 or 2. This operating position corresponds to the operating position of FIG. 2. If the pressure in the pressure line P now rises again above the minimum switching pressure, then the pressure-limiting valve 30 opens again and the control pistons I, II, III move in this sequence successively from their left end position shown in FIG. 5 into the right end position shown in FIG. 4, until the switching chamber 63 is connected to the pressure line P and switching piston 55 has traveled into its right end position. A switching process and a drive cycle are thus completed.

The progressive distributor 16 can also be embodied with only two control pistons. However, it has shown that in this case when the lubricating pump 1 is started, occasional starting difficulties of the control piston I, II, III arise and the lubricating pump 1 does not start. With three or more control pistons this problem does not arise. In principle, more control pistons I, II, III could also be used, but this is not required for the implementation of the required functionality and means a higher constructive cost.

Figure 6:
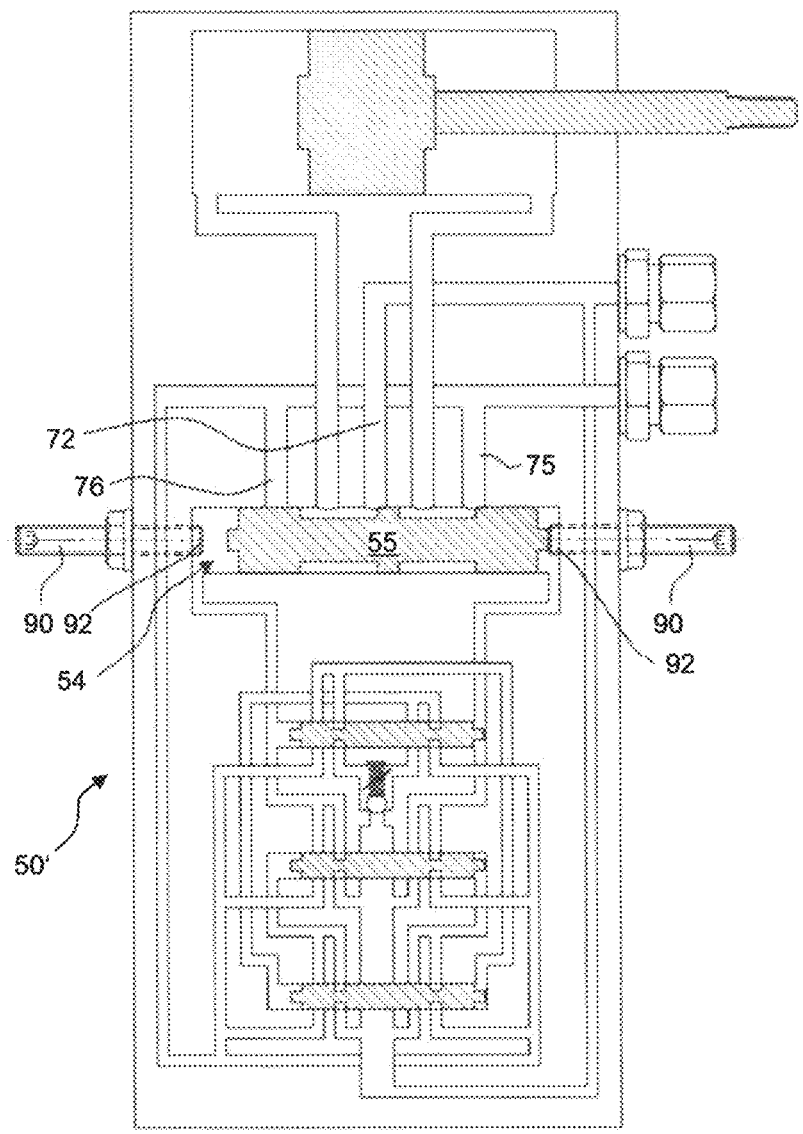
FIG. 6 is a further embodiment of a switching device according to the disclosure.

In FIG. 6 an expanded embodiment of the switching unit 50, identical with respect to the already-described functionality, is depicted in the form of a switching unit 50'. Here two adjusting screws 90 are screwed into the switching unit 50' from outside such that their ends 92 project into the switching chamber 54. The adjusting screws 90 can be screwed deeper into the chamber 54 from outside and farther out than depicted in FIG. 6. They represent an adjustable stop for the switching piston 55, so that its two end positions in the chamber 54 are adjustable. In the representation of FIG. 6, the right adjusting screw 90 is rotated into the chamber 54 to an extent that in its right end position the switching piston 55 still partially closes the drive channel 72 and 75. The same applies in the left end position with respect to the drive channel 72 and 76. This makes possible a reduction of the actual volumetric flow of hydraulic fluid that reaches the hydraulic drive.

The principles of the invention can be applied to numerous further designs of lubricating pumps and the pumps can be correspondingly advantageously designed.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved switching devices and lubricating pumps.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A switching device for alternately connecting a hydraulic drive of a lubricating pump to a pressure line and to a return line of a hydraulic circuit, the switching device comprising:
   a first drive line and a second drive line connectable to the hydraulic drive,
   a pressure drive line connectable to the pressure line and a return drive line connectable to the return line,
   a switching valve in fluid communication with the first and second drive lines and the pressure drive line and the return drive line, the switching device being switchable between a first switching state and a second switching state such that in the first switching state the pressure drive line is connected to the first drive line and in the second switching state the pressure drive line is connected to the second drive line, a hydraulic control unit including a plurality of hydraulic lines, the hydraulic lines comprising control lines and switching lines, a first one of the control lines being connected to the pressure drive line, wherein at least two of the switching lines are configured such that the switching valve is switchable by the at least two switching lines between the first switching state and the second switching state, and wherein the first and second drive lines and the pressure drive line and the return drive line are configured to conduct a first volumetric flow of hydraulic fluid and the plurality of hydraulic lines are configured to conduct a second volumetric flow of the hydraulic fluid different than the first volumetric flow, and wherein a diameter of the plurality of hydraulic lines is less than a diameter of the first drive line or is less than a diameter of the pressure drive line, wherein the hydraulic control unit comprises a progressive distributor, and wherein the progressive distributor includes at least two control pistons that are hydraulically connected to the switching lines and wherein at least one of the at least two control pistons is configured to be controllable by the switching lines.

2. The switching device according to claim 1, wherein in the first switching state the second drive line is connected to the return drive line, and in the second switching state the first drive line is connected to the return drive line.

3. The switching device according to claim 1, wherein the switching valve comprises a switching piston cooperating with a first switching chamber and a second switching chamber, and the first and second switching chambers are connected to the at least two switching lines of the hydraulic control unit.

4. The switching device according to claim 1, further comprising at least one adjusting unit that is configured to cooperate with the switching valve such that the volumetric flow directable through the first and second drive lines in the first and second switching states is adjustable.

5. The switching device according to claim 1, wherein the hydraulic control unit comprises a progressive distributor.

6. The switching device according to claim 5, wherein:
the at least two switching lines include a first switching line and a second switching line, and
a first outlet of the progressive distributor is connected to the first switching line and a second outlet of the progressive distributor is connected to the second switching line.

7. The switching device according to claim 1, wherein the progressive distributor includes a pressure-limiting valve.

8. A lubricating pump comprising:
a pumping unit for pumping lubricant,
the switching device according to claim 1, and
the hydraulic drive,
wherein the switching device is connected to the pumping unit and to the hydraulic drive.

9. A switching device for alternately connecting a hydraulic drive of a lubricating pump to a pressure line and to a return line of a hydraulic circuit, the switching device comprising:
a first drive line and a second drive line connectable to the hydraulic drive,
a pressure drive line connectable to the pressure line and a return drive line connectable to the return line, a switching valve in fluid communication with the first and second drive lines and the pressure drive line and the return drive line, the switching device being switchable between a first switching state and a second switching state such that in the first switching state the pressure drive line is connected to the first drive line and in the second switching state the pressure drive line is connected to the second drive line, at least one adjusting unit that is configured to cooperate with the switching valve such that the volumetric flow directable through the control lines in the first and second switching states is adjustable a hydraulic control unit including a plurality of hydraulic lines, the hydraulic lines comprising control lines and switching lines, a first one of the control lines being connected to the pressure drive line, wherein at least two of the switching lines are configured such that the switching valve is switchable by the at least two switching lines between the first switching state and the second switching state, and wherein the first and second drive lines and the pressure drive line and the return drive line are configured to conduct a first volumetric flow of hydraulic fluid and the plurality of hydraulic lines are configured to conduct a second volumetric flow of the hydraulic fluid different than the first volumetric flow, wherein a diameter of the plurality of hydraulic lines is less than a diameter of the first drive line or is less than a diameter of the pressure drive line, wherein the switching valve comprises a switching piston cooperating with a first switching chamber and a second switching chamber, and a first switching line of the at least two switching lines is connected to the first switching chamber and a second switching line of the at least two switching lines is connected to the second switching chamber, wherein the control unit comprises a progressive distributor, wherein a first outlet of the progressive distributor is connected to the first switching line and the second outlet of the progressive distributor is connected to the second switching line, and wherein the progressive distributor includes at least two control pistons that are hydraulically connected to the switching lines, at least one of the at least two control pistons being configured to be controllable by the switching lines.

10. The switching device according to claim 1,
where the at least one adjusting unit comprises at least one movable stop configured to limit axial movement of the switching piston.

11. The switching device according to claim 10,
wherein the at least one movable stop comprises at least one adjusting screw.

12. A switching device for alternately connecting a hydraulic drive of a lubricating pump to a pressure line and to a return line of a hydraulic circuit, the switching device comprising:
a first drive line and a second drive line connectable to the hydraulic drive,
a pressure drive line connectable to the pressure line and a return drive line connectable to the return line,
a switching valve in fluid communication with the first and second drive lines and the pressure drive line and the return drive line, the switching device being switchable between a first switching state and a second switching state such that in the first switching state the pressure drive line is connected to the first drive line and in the second switching state the pressure drive line is connected to the second drive line, a hydraulic control unit including a plurality of hydraulic lines the hydraulic lines comprising control lines and switching lines, a first one of the control lines being connected to the pressure drive line, and at least one adjusting unit that is configured to cooperate with the switching valve such that the volumetric flow directable through the first and second drive lines in the first and second switching states is adjustable, wherein at least two of the switching lines are configured such that the switching valve is switchable by the at least two switching lines between the first switching state and the second switching state, wherein the first and second drive lines and the pressure drive line and the return drive line are configured to conduct a first volumetric flow of hydraulic fluid and the plurality of hydraulic lines are configured to conduct a second volumetric flow of the hydraulic fluid different than the first volumetric flow, wherein a diameter of the plurality of hydraulic lines is less than a diameter of the first drive line or is less than a diameter of the pressure drive line, wherein the switching valve includes a switching piston, and wherein the at least one adjusting unit comprises at least one movable stop configured to limit axial movement of the switching piston.

13. The switching device according to claim 12, wherein the at least one movable stop comprises at least one adjusting screw.

* * * * *